(12) United States Patent
Wang et al.

(10) Patent No.: US 12,129,371 B2
(45) Date of Patent: Oct. 29, 2024

(54) HETEROPHASIC PROPYLENE ETHYLENE COPOLYMER COMPOSITION WITH EXCELLENT OPTICAL AND SEALING PROPERTIES

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersüss, Linz (AT); Stefan Ortner, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 18/568,367

(22) PCT Filed: Jun. 13, 2022

(86) PCT No.: PCT/EP2022/065958
§ 371 (c)(1),
(2) Date: Dec. 8, 2023

(87) PCT Pub. No.: WO2022/263345
PCT Pub. Date: Dec. 22, 2022

(65) Prior Publication Data
US 2024/0270949 A1      Aug. 15, 2024

(30) Foreign Application Priority Data
Jun. 14, 2021   (EP) ..................... 21179172

(51) Int. Cl.
*C08L 23/16*     (2006.01)
*C08J 5/18*      (2006.01)

(52) U.S. Cl.
CPC ................. *C08L 23/16* (2013.01); *C08J 5/18* (2013.01); *C08J 2323/16* (2013.01); *C08J 2423/14* (2013.01); *C08L 2203/162* (2013.01); *C08L 2207/02* (2013.01); *C08L 2207/10* (2013.01)

(58) Field of Classification Search
CPC ........... C08L 23/00–36; C08L 2207/02; C08L 2207/10–14
See application file for complete search history.

(56) References Cited

U.S. PATENT DOCUMENTS

| | | | |
|---|---|---|---|
| 2019/0367715 A1 | 12/2019 | Wang et al. | |
| 2020/0317895 A1 | 10/2020 | Gahleitner | |
| 2021/0047502 A1 | 2/2021 | Gahleitner et al. | |
| 2021/0355308 A1 | 11/2021 | Wang et al. | |

FOREIGN PATENT DOCUMENTS

| CN | 112955505 A | 6/2021 | |
|---|---|---|---|
| EP | 0887379 B1 | 12/2004 | |
| EP | 2829397 A1 * | 1/2015 | ............ B32B 27/08 |
| EP | 2960256 A1 | 12/2015 | |
| EP | 2960279 A1 | 12/2015 | |
| EP | 3502177 A1 | 6/2019 | |
| EP | 3812404 A1 | 4/2021 | |
| RU | 2744581 C1 | 3/2021 | |
| WO | 9212182 A1 | 7/1992 | |
| WO | 2016066446 A1 | 5/2016 | |
| WO | 2018077663 A1 | 5/2018 | |
| WO | WO-2019121597 A1 * | 6/2019 | ............ C08F 10/02 |
| WO | WO-2019199824 A1 * | 10/2019 | ............ C08J 9/365 |
| WO | 2020011825 A1 | 1/2020 | |
| WO | 2020239598 A1 | 12/2020 | |

OTHER PUBLICATIONS

Office Action with English Translation for Chinese Patent Application No. 202280041179.8 dated Apr. 1, 2024, 12 pages.
International Search Reprot and Written Opinion of the Internationl Searching Authority for PCT/EP2022/065958, mailed Oct. 11, 2022, 12 pages.
European Search Report for European Patent Application No. 2117991728 dated Nov. 25, 2021, 5 pages.
Busico, et al., "Microstructure of polypropylene," Progress in Polymer Science, vol. 26, 2001, pp. 443-533, Elsevier.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Busico, et al., "Full Assignment of the 13C NMR Spectra of Regioregular Polypropylenes: Methyl and Methylene Region," Macromolecules, 1997, vol. 30, pp. 6251-6263, American Chemical Society.
Zweifel, et al., "Plastic Additives Handbook", 6th edition, Hanser Publications, 2009 pp. 1141 to 1190.
Resconi, et al., "Selectivity in Propene Polymerization with Metallocene Catalysts," Chem. Rev., 2000, vol. 100, pp. 1253-1345.
Zhou, et al., "A new decoupling method for accurate quantification of polyethylene copolymer composition and triad sequence distribution with 13C NMR," Journal of Magnetic Resonance, vol. 187, 2007, pp. 225-233.
Office Action for Russian Application No. 2024100121 with English Translation dated Aug. 28, 2024, 29 pages.

(Continued)

*Primary Examiner* — Prashant J Khatri
(74) *Attorney, Agent, or Firm* — Lowenstein Sandler LLP

(57) ABSTRACT

A heterophasic propylene ethylene copolymer composition having an $MFR_2$ of 1.0 to 5.0 g/10 min, a C2 content of 0.8 to 6.0 mol-%, and a $T_m$ of 153.0 to 159.0° C., comprising: a) a crystalline matrix (M) being a propylene homo- or copolymer, preferably a homopolymer; and b) an amorphous propylene-ethylene elastomer (E); wherein the heterophasic propylene ethylene copolymer composition is characterized in terms of its soluble fraction (SF) and crystalline fraction (CF) as determined by CRYSTEX QC analysis: i) from 85.0 to 90.0 wt.-% of a crystalline fraction (CF) having an iV(CF) of 2.00 to 3.00 dl/g, a C2(CF) of 0.0 to 1.5 mol-%; and ii) from 10.0 to 15.0 wt.-% of a soluble fraction (SF) having an iV(SF) of 1.30 to 2.50 dl/g and a C2(SF) of 25.0 to 40.0 mol-%.

16 Claims, 1 Drawing Sheet

(56) References Cited

OTHER PUBLICATIONS

Basov N.I. et al. Quality control of polymer materials. 2nd ed. reprint Leningrad Publishing House Chemistry 1990 with English translation, 116 pages.

Kurguzova O. A. "Development of a wear-resistant nanocomposite", Based on Polytetrafluoroethylene for the Purpose of Increasing Performance and Durability of Metal-Polymer Sealing Devices, thesis for a Candidate Degree in Technical Sciences Omsk, 2014, 131 pages.

* cited by examiner

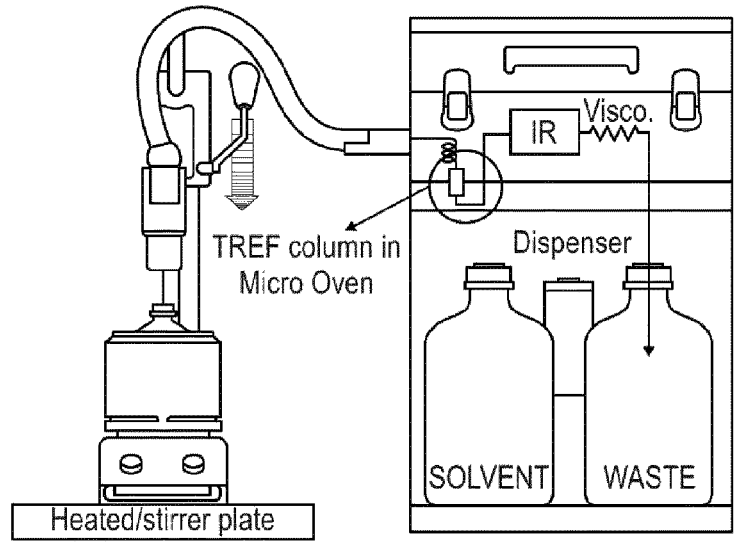
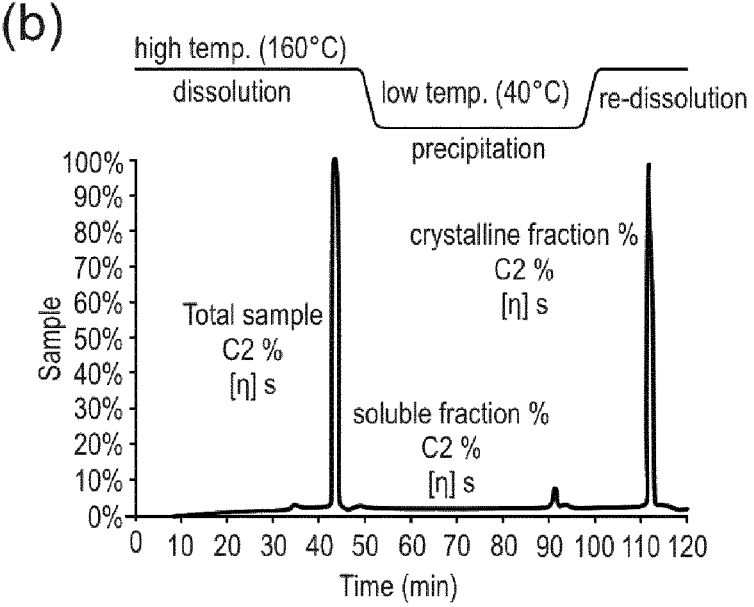
: (a) Schematic diagram of the CRYSTEX QC instrument (b) Elution of the EP copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene

HETEROPHASIC PROPYLENE ETHYLENE COPOLYMER COMPOSITION WITH EXCELLENT OPTICAL AND SEALING PROPERTIES

CROSS-REFERENCE TO RELATED APPLICATION(S)

The present application is a national stage entry under 35 U.S.C. § 371 of International Application No. PCT/EP2022/065958, filed on Jun. 13, 2022, which claims priority to European Patent Application No. 21179172.8, filed on Jun. 14, 2021. The contents of these applications are hereby incorporated by reference in their entirety.

FIELD OF THE INVENTION

The present invention relates to a heterophasic propylene ethylene copolymer composition with excellent optical and sealing properties and films made therefrom.

BACKGROUND TO THE INVENTION

Films of heterophasic propylene copolymers are used in a wide range of areas, e.g. food packaging, such as wrapping films and containers. Such films are known for their well-balanced properties like strength, stiffness, transparency and resistance to impact, among others. Metallized films are also used as a packaging material, for example, in the form of a layered polypropylene film/aluminium foil structure.

Whilst such films have been shown to have well-balanced properties, optimising the balance of mechanical properties, optical properties and sealing properties remains a fine art, with compromises to some properties being required to obtain improvements in other areas.

In order to obtain a good balance of mechanic properties, compositions based upon Ziegler-Natta-catalysed polypropylene are often used: however, such compositions can often have less ideal sealing properties and optical properties, especially after steam sterilization.

WO 2018/077663 A1 describes heterophasic polypropylene compositions having optimised optical and mechanical properties as well as low amount of extractables. These compositions are obtainable through the use of Ziegler-Natta catalysis. The heterophasic polypropylene compositions are processed into films, which are said to be useful for food packaging applications.

WO 2020/011825 A1 describes a metallocene-based heterophasic polypropylene composition having high stiffness, high toughness and high transparency, wherein the beneficial properties are obtained through blending the metallocene-based heterophasic polypropylene with a minor amount of Ziegler-Natta-based heterophasic polypropylene. The metallocene-based heterophasic polypropylene copolymer component present in the composition has a relatively low ethylene content and soluble fraction content.

Despite developments in this field, there remains a need to provide a simple heterophasic polypropylene composition having improved sealing and optical properties without sacrificing the mechanical performance, in particular for materials that are easy to produce and process, in particular not requiring extra process steps or additional polymer components to achieve the desired properties.

SUMMARY OF THE INVENTION

The present invention is based upon the finding that a heterophasic propylene ethylene copolymer composition having specific properties, including melting temperature and crystalline/soluble fraction contents according to CRYSTEX QC analysis and the individual properties of each fraction, has improved sealing properties and optical properties both before and after steam sterilization.

The present invention is directed to a heterophasic propylene ethylene copolymer composition (HECO) having a melt flow rate ($MFR_2$) measured according to ISO 1133 at 230° C. and 2.16 kg in the range from 1.0 to 5.0 g/10 min, a total ethylene content C(C2), as determined by quantitative IR spectroscopy, in the range from 0.8 to 6.0 mol-%, and a melting temperature ($T_m$) measured by differential scanning calorimetry (DSC) in the range from 153.0 to 159.0° C., comprising:

a) a crystalline matrix (M) being a propylene homo- or copolymer, preferably a homopolymer; and
b) an amorphous propylene-ethylene elastomer (E);

wherein the heterophasic propylene ethylene copolymer composition is characterized in terms of its soluble fraction (SF) and crystalline fraction (CF) as determined by CRYSTEX QC analysis:

i) from 85.0 to 90.0 wt.-%, based on the total weight of the heterophasic propylene ethylene copolymer composition, of a crystalline fraction (CF) having an intrinsic viscosity iV(CF) measured according to DIN ISO 1628/1, October 1999 (in Decalin at 135° C.) in the range from 2.00 to 3.00 dl/g, an ethylene content C2(CF), as determined by quantitative IR spectroscopy, in the range from 0.0 to 1.5 mol-%; and ii) from 10.0 to 15.0 wt.-%, based on the total weight of the heterophasic propylene ethylene copolymer composition, of a soluble fraction (SF) having an intrinsic viscosity iV(SF) measured according to DIN ISO 1628/1, October 1999 (in Decalin at 135° C.) in the range from 1.30 to 2.50 dl/g and an ethylene content C2(SF), as determined by quantitative IR spectroscopy, in the range from 25.0 to 40.0 mol-%.

In another aspect, the present invention is directed to a film, preferably a cast film, comprising at least 90 wt.-% of the inventive heterophasic propylene ethylene copolymer composition (HECO).

Definitions

A heterophasic polypropylene is a propylene-based copolymer with a crystalline matrix phase, which can be a propylene homopolymer or a random copolymer of propylene and at least one alpha-olefin comonomer, and an elastomeric phase dispersed therein. In case of a random heterophasic propylene copolymer, said crystalline matrix phase is a random copolymer of propylene and at least one alpha-olefin comonomer. The polymers according to the present invention have such morphology.

The elastomeric phase can be a propylene copolymer with a high amount of comonomer that is not randomly distributed in the polymer chain but is distributed in a comonomer-rich block structure and a propylene-rich block structure. A heterophasic polypropylene usually differentiates from a one-phasic propylene copolymer in that it shows two distinct glass transition temperatures Tg which are attributed to the matrix phase and the elastomeric phase.

A propylene homopolymer is a polymer that essentially consists of propylene monomer units. Due to impurities especially during commercial polymerization processes, a propylene homopolymer can comprise up to 0.1 mol-% comonomer units, preferably up to 0.05 mol-% comonomer units and most preferably up to 0.01 mol-% comonomer units. A propylene random copolymer is a copolymer of propylene monomer units and comonomer units, preferably selected from ethylene and C4-C12 alpha-olefins, in which the comonomer units are distributed randomly over the polymeric chain. The propylene random copolymer can comprise comonomer units from one or more comonomers different in their amounts of carbon atoms. In the following amounts are given in % by weight (wt.-%) unless it is stated otherwise.

DETAILED DESCRIPTION OF THE INVENTION

The Heterophasic Propylene Ethylene Copolymer Composition (HECO)

In a heterophasic propylene copolymer the matrix and elastomeric phases cannot be separated and measured, since the elastomeric phase is dispersed within the crystalline matrix. In order to characterize the matrix and elastomeric phases of a heterophasic propylene copolymer several methods are known. One method is the extraction with xylene of a fraction that contains for the most part the elastomeric phase, thus separating a xylene cold soluble (XCS) fraction from a xylene cold insoluble (XCI) fraction. The XCS fraction contains for the most part the elastomeric phase and only a small part of the matrix phase, whereas the XCI fraction contains for the most part the matrix phase and only a small part of the elastomeric phase.

As an alternative method the separation of a crystalline fraction and a soluble fraction with the CRYSTEX QC method using trichlorobenzene (TCB) as a solvent. This method is described below in the determination methods section. The crystalline fraction (CF) contains for the most part the matrix phase and only a small part of the elastomeric phase and the soluble fraction (SF) contains for the most part the elastomeric phase and only a small part of the matrix phase. In some cases, this method results in more useful data, since the crystalline fraction (CF) and the soluble fraction (SF) more accurately correspond to the matrix and elastomeric phases respectively. Due to the differences in the separation methods of xylene extraction and CRYSTEX QC method the properties of XCS/XCI fractions on the one hand and crystalline/soluble (CF/SF) fractions on the other hand are not exactly the same, meaning that the amounts of matrix phase and elastomeric phase can differ as well as the properties.

Crystalline Fraction of the CRYSTEX QC Measurement

The heterophasic propylene ethylene copolymer composition (HECO) of the present invention has a content of crystalline fraction (CF) within the range from 85.0 to 90.0 wt.-%, more preferably 86.0 to 89.0 wt.-%, based on the total weight of the heterophasic propylene ethylene copolymer composition.

The crystalline fraction (CF) of the heterophasic propylene ethylene copolymer composition (HECO) of the present invention has an intrinsic viscosity iV(CF) measured according to DIN ISO 1628/1, October 1999 (in Decalin at 135° C.) in the range from 2.00 to 3.00 dl/g, more preferably in the range from 2.20 to 2.80 dl/g, most preferably in the range from 2.30 to 2.60 dl/g.

The crystalline fraction (CF) of the heterophasic propylene ethylene copolymer composition (HECO) of the present invention has an ethylene content C2(CF), as determined by quantitative IR spectroscopy, in the range from 0.0 to 1.5 mol-%, more preferably in the range from 0.0 to 1.0 mol-%, most preferably in the range from 0.0 to 0.5 mol-%.

Soluble Fraction of the CRYSTEX QC Measurement

The heterophasic propylene ethylene copolymer composition (HECO) of the present invention has a content of soluble fraction (SF) within the range from 10.0 to 15.0 wt.-%, more preferably 11.0 to 14.0 wt.-%, based on the total weight of the heterophasic propylene ethylene copolymer composition.

The soluble fraction (SF) of the heterophasic propylene ethylene copolymer composition (HECO) of the present invention has an intrinsic viscosity iV(SF) measured according to DIN ISO 1628/1, October 1999 (in Decalin at 135° C.) in the range from 1.30 to 2.50 dl/g, more preferably in the range from 1.50 to 2.40 dl/g, most preferably in the range from 1.80 to 2.30 dl/g.

The soluble fraction (SF) of the heterophasic propylene ethylene copolymer composition (HECO) of the present invention has an ethylene content C2(SF), as determined by quantitative IR spectroscopy, in the range from 25.0 to 40.0 mol-%, more preferably in the range from 25.0 to 36.0 mol-%, most preferably in the range from 25.0 to 33.0 mol-%

According to the present invention, the ratio of the intrinsic viscosities of the two fractions, iV(SF)/iV(CF), is preferably in the range from 0.50 to 1.00, more preferably in the range from 0.65 to 0.95, most preferably in the range from 0.75 to 0.90.

The heterophasic propylene ethylene copolymer composition (HECO) of the present invention has a melt flow rate (MFR$_2$) measured according to ISO 1133 at 230° C. and 2.16 kg in the range from 1.0 to 5.0 g/10 min, more preferably from 1.5 to 4.0 g/10 min, most preferably in the range from 1.5 to 3.0 g/10 min.

The heterophasic propylene ethylene copolymer composition (HECO) of the present invention has an ethylene content C(C2), as determined by quantitative IR spectroscopy, preferably in the range from 0.8 to 6.0 mol-%, more preferably in the range from 1.0 to 4.0 mol-%, most preferably in the range from 1.5 to 3.0 mol-%.

The heterophasic propylene ethylene copolymer composition (HECO) of the present invention preferably has an intrinsic viscosity (iV) measured according to DIN ISO 1628/1, October 1999 (in Decalin at 135° C.) in the range from 2.00 to 3.00 dl/g, more preferably from 2.10 to 2.70 dl/g, most preferably in the range from 2.20 to 2.50 dl/g.

The crystalline matrix component (M) of the heterophasic propylene ethylene copolymer composition (HECO) preferably has a melt flow rate (MFR$_2$), measured according to ISO 1133 at 230° C. and 2.16 kg in the range from 1.0 to 100 g/10 min, more preferably from 1.0 to 10.0 g/10 min, yet more preferably from 1.5 to 6.0 g/10 min, most preferably from 2.0 to 4.0 g/10 min.

It is preferred that the crystalline matrix component (M) of the heterophasic propylene ethylene copolymer composition (HECO) of the present invention is a propylene homopolymer.

When the crystalline matrix component (M) of the heterophasic propylene ethylene copolymer composition (HECO) is a propylene homopolymer, it preferably has an isotactic pentad concentration [mmmm] as determined by 13C-NMR spectroscopy of more than 97.0%, and a content of 2,1-regiodefects in the range from 0.1 to 1.4 mol-%. These values are indicative of heterophasic propylene ethylene copolymers that have been produced in the presence of a single-site catalyst.

In many similar heterophasic propylene copolymers, it is necessary to adjust the rheological and mechanical properties of the final composition by treatment of the raw heterophasic propylene copolymer with a radical initiator, often in the extrusion step. This process may be known as visbreaking. The properties of the heterophasic propylene ethylene copolymer composition (HECO) of the present invention are suitably desirable, and therefore no visbreaking (or similar treatment) is necessary to obtain superior properties. It is, therefore, preferred that the heterophasic propylene ethylene copolymer composition (HECO) is free from radical initiators and decomposition products thereof, more preferably the heterophasic propylene ethylene copolymer composition (HECO) has not been visbroken.

The heterophasic propylene ethylene copolymer composition (HECO) of the present invention preferably has a glass transition temperature associated with the amorphous propylene-ethylene elastomer ($T_g(E)$), measured according to ISO 6721-7, in the range from −50 to −40° C. more preferably in the range from −48 to −41° C., most preferably in the range from −46 to −42° C.

The heterophasic propylene ethylene copolymer composition (HECO) of the present invention preferably has a glass transition temperature associated with the crystalline matrix ($T_g(M)$), measured according to ISO 6721-7, in the range from −5 to 5° C. more preferably in the range from −3 to 2° C., most preferably in the range from −2 to 0° C.

The heterophasic propylene ethylene copolymer composition (HECO) of the present invention preferably has a melting temperature ($T_m$) measured by differential scanning calorimetry (DSC) in the range from 153.0 to 159.0° C., more preferably in the range from 154.0 to 158.5° C., most preferably in the range from 155.0 to 158.0° C. These values are indicative of heterophasic propylene ethylene copolymers that have been produced in the presence of a single-site catalyst.

The heterophasic propylene ethylene copolymer composition (HECO) of the present invention preferably has a crystallisation temperature ($T_c$) measured by differential scanning calorimetry (DSC) in the range from 120.0 to 127.0° C., more preferably in the range from 121.0 to 126.0° C., most preferably in the range from 122.0 to 125.0° C.

The heterophasic propylene ethylene copolymer composition (HECO) of the present invention preferably has a flexural modulus measured according to ISO 178 in the range from 1100 to 1500 MPa, more preferably in the range from 1200 to 1450 MPa, most preferably in the range from 1250 to 1400 MPa.

The heterophasic propylene ethylene copolymer composition (HECO) of the present invention preferably has a Charpy Notched Impact Strength (NIS) measured according to ISO 179-1 eA at 23° C. in the range from 25.0 to 100 kJ/m$^2$, more preferably in the range from 30.0 to 80 kJ/m$^2$, most preferably in the range from 35.0 to 60 kJ/m$^2$.

The heterophasic propylene ethylene copolymer composition (HECO) of the present invention preferably has a Charpy Notched Impact Strength (NIS) measured according to ISO 179-1 eA at −20° C. in the range from 1.0 to 20 kJ/m$^2$, more preferably in the range from 1.4 to 10.0 kJ/m$^2$, most preferably in the range from 1.8 to 6.0 kJ/m$^2$.

In addition to the fractions as discussed above, the heterophasic propylene ethylene copolymer composition of the present invention may comprise additives.

Preferably, the heterophasic propylene ethylene copolymer composition (HECO) comprises from 0.01 to 5.0 wt.-%, more preferably 0.03 to 3.0 wt.-%, still more preferably 0.06 to 2.0 wt.-%, most preferably 0.08 to 1.0 wt.-% of additives, based on the weight of the heterophasic propylene ethylene copolymer composition (HECO).

Such additives are commercially available and for example described in "Plastic Additives Handbook", 6$^{th}$ edition 2009 of Hans Zweifel (pages 1141 to 1190).

Process for the Polymerization of the Heterophasic Propylene Copolymer (HECO)

The heterophasic propylene copolymer (HECO) of the present invention may be polymerized by sequential polymerization in the presence of a single-site catalyst system, wherein a) a first polypropylene fraction being a propylene homopolymer or a propylene random copolymer, preferably having a comonomer content of 0.0 to 1.5 mol-%, is prepared in a bulk phase reactor in a first polymerization stage b) optionally transferring said first polypropylene fraction into second polymerization stage in which a second polypropylene fraction being a propylene homopolymer or a propylene-ethylene random copolymer, preferably having a comonomer content of 0.0 to 1.5 mol-%, is prepared in a gas phase reactor (GPR1), c) transferring the first polypropylene fraction (a) or the mixture comprising said first and second polypropylene fraction together (b) to a second (optionally third) polymerization stage in which the amorphous propylene-ethylene elastomer having a comonomer content (C2 of SF) of 25.0 to 40.0 mol-%, like 25.0 to 36.0 mol-%, or 25.0 to 33.0 mol-% is prepared in a gas phase reactor, d) the mixture of said two, optionally three polymers, optionally being subjected to a deactivation and purification step followed by compounding and pelletisation.

In a preferred embodiment, the polymerization process is carried out in the presence of a single-site catalyst system as laid out herein.

The heterophasic polypropylene composition of the present invention is typically and preferably made in a multistep process well known in the art. A preferred multistage process is a loop-gas phase-process, such as developed by Borealis A/S, Denmark (known as BORSTAR® technology) described e.g. in patent literature, such as in EP-A-0887379 or in WO 92/12182. An alternative multistage process is the Spheripol process of LyondellBasell, USA.

The invention preferably relates to the copolymerization of propylene, ethylene and optionally further comonomers as defined above and below, in an at least two, optionally three step process so as to form the heterophasic polypropylene composition. Preferably, propylene and ethylene are the only monomers used.

Ideally, the process of the invention employs two, preferably three main reactors, a first reactor operating in bulk, a first gas phase reactor and optionally a second gas phase reactor.

The process may also utilize a prepolymerization step, taking place in a separate reactor before the three main reactors.

The crystalline matrix may preferably be present in the range of 80 to 93 wt.-%, more preferably in the range of 81 to 90 wt.-%, most preferably in the range of 83 to 89 wt.-%, based on the total weight of the heterophasic polypropylene composition.

The elastomeric phase comprised in the heterophasic polypropylene composition and dispersed in above mentioned matrix, may preferably be present in the range of 7 to 20 wt.-%, more preferably in the range of 10 to 19 wt.-%, most preferably in the range of 11 to 17 wt.-%, based on the total weight of the heterophasic polypropylene composition.

The comonomer content, C(C2) (total), of the inventive polymer may be in the range of 0.8 to 6.0 mol-%, more preferably in the range from 1.0 to 4.0 mol-%, most preferably in the range from 1.5 to 3.0 mol-%.

Unimodal Matrix

The crystalline matrix being a propylene homo- or copolymer is produced in a bulk step, then transferred to the second stage in which the amorphous propylene ethylene elastomer is produced in a first gas phase reactor (GPR1) in the presence of the first polypropylene fraction.

The comonomer content of the crystalline matrix may be in the range of 0.0 to 1.5 mol-%, preferably in the range of 0.0 to 1.2 mol-%, more preferably in the range of 0.0 to 1.0 mol-%.

It is particularly preferable that the crystalline matrix (a) is a propylene homopolymer and comprises 0.0 wt.-% of comonomer.

The MFR of the crystalline matrix may be in the range of 1.0 to 10.0 g/10 min, more preferably in the range from 1.5 to 6.0 g/10 min, most preferably in the range from 2.0 to 4.0 g/10 min. This applies regardless of the (bi)-modality of the crystalline matrix.

Bimodal Matrix

In case, the crystalline matrix is bimodal, then the first polypropylene fraction is produced in a bulk step, then transferred to the second stage in which the second polypropylene fraction is prepared in a first gas phase reactor (GPR1) in the presence of the first polypropylene fraction. This mixture, being the crystalline matrix and comprising said first and second polypropylene fractions together, is transferred to the third stage in which the amorphous propylene-ethylene elastomer is prepared in a gas phase reactor (GPR2) in the presence of the crystalline matrix.

The $MFR_2$ of the polymer produced in the first stage, being the first polypropylene fraction, may be in the range of 1.0 to 10.0 g/10 min, more preferably in the range from 1.5 to 6.0 g/10 min, most preferably in the range from 2.0 to 4.0 g/10 min.

The $MFR_2$ of the polymer produced in the second stage, being the second polypropylene fraction, may be in the range of 1.0 to 10.0 g/10 min, more preferably in the range from 1.5 to 6.0 g/10 min, most preferably in the range from 2.0 to 4.0 g/10 min.

Given the second polypropylene fraction is produced in the presence of the first polypropylene fraction, it is understood, that it's properties cannot be analysed as such, but have to be determined based on the properties of the first polypropylene fraction and the properties of the crystalline fraction.

In a preferred embodiment, the heterophasic polypropylene composition comprises a1) 40-60 wt.-%, preferably in the range of 42 to 57 wt.-%, more preferably in the range of 45 to 55 wt.-% of a first polypropylene fraction having an $MFR_2$ of 1.0 to 10.0 g/10 min, a2) 28-40 wt.-%, preferably in the range of 29 to 38 wt.-%, more preferably in the range of 30 to 36 wt.-% of a second polypropylene fraction having an $MFR_2$ of 1.0 to 10.0 g/10 min, b) 7 to 20 wt.-% of the amorphous propylene ethylene elastomer, preferably in the range of 10 to 19 wt.-%, most preferably in the range of 11 to 17 wt.-%.

Preferably, the amount of the first polypropylene fraction is equal or higher than the amount of the second polypropylene fraction based on the total weight of the crystalline matrix.

The amount of the first polypropylene fraction may be in the range of 50 to 75 wt.-%, preferably 55 to 70 wt.-%, more preferably in the range of 60 to 65 wt.-% based on the total weight of the crystalline matrix.

The amount of the second polypropylene fraction may be in the range of 25 to 50 wt.-%, preferably 30 to 45 wt.-%, more preferably in the range of 35 to 40 wt.-% based on the total weight of the crystalline matrix.

The ratio of the amount of the first and the second polypropylene fraction may be in the ranges of 50:50 to 75:25, like 55:45 to 70:30, preferably 60:40 to 65:35.

For bulk and gas phase copolymerization reactions, the reaction temperature used will generally be in the range 60 to 115° C. (e.g. 70 to 110° C.), the reactor pressure will generally be in the range 10 to 40 bar for gas phase reactions with bulk polymerization operating at slightly higher pressures. The residence time will generally be 0.25 to 8 hours (e.g. 0.3 to 3 hours).

The comonomer content of the first and second polypropylene fraction may be same or different and independently chosen from each other.

The comonomer content of the polymer produced in the first stage, namely the first polypropylene fraction, may be in the range of 0.0 to 1.5 mol-%, preferably in the range of 0.0 to 1.2 mol-%, more preferably in the range of 0.0 to 1.0 mol-%.

It is particularly preferable that the first polypropylene fraction is a propylene homopolymer and comprises 0.0 wt.-% of comonomer.

The comonomer content of the polymer produced in the second stage, namely the second polypropylene fraction, may be in the range of 0.0 to 1.5 mol-%, preferably in the range of 0.0 to 1.2 mol-%, more preferably in the range of 0.0 to 1.0 mol-%.

It is particularly preferable, that the second polypropylene fraction is a propylene homopolymer and comprises 0.0 wt.-% of comonomer.

Within this application it is understood, that the comonomer content of the crystalline matrix, when available as distinct material sample, is determined via quantitative FT-IR spectroscopy calibrated by 13C-NMR spectroscopy. When the comonomer content of the matrix and the dispersed fraction should be evaluated starting from the final polymer (comprising both the matrix and the dispersed fraction), then the matrix (and its properties) is reflected by the crystalline fraction (CF) determined according to CRYSTEX QC analysis. Accordingly, the dispersed amorphous propylene ethylene elastomer is reflected by the soluble fraction (SF) determined according to CRYSTEX QC analysis.

Catalyst System

The heterophasic polypropylene composition according to the invention is preferably obtainable by a catalyst system comprising by a single-site catalyst, more preferably being obtainable by a metallocene catalyst complex and cocatalysts.

Preferred complexes of the metallocene catalyst include:

rac-dimethylsilanediylbis[2-methyl-4-(3',5'-dimethylphenyl)-5-methoxy-6-tert-butylinden-1-yl] zirconium dichloride, rac-anti-dimethylsilanediyl[2-methyl-4-(4'-tert-butylphenyl)-inden-1-yl][2-methyl-4-(4'-tertbutylphenyl)-5-methoxy-6-tert-butylinden-1-yl] zirconium dichloride, rac-anti-dimethylsilanediyl[2-methyl-4-(4'-tert-butylphenyl)-inden-1-yl][2-methyl-4-phenyl-5-methoxy-6-tert-butylinden-1-yl] zirconium dichloride, rac-anti-dimethylsilanediyl[2-methyl-4-(3',5'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride, rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride, rac-anti-dimethylsilanediyl[2-methyl-4,8-bis-(3,5"-dimethylphenyl)-1,5,6,7-tetrahydro-s-indacen-1-yl] [2-methyl-4-(3',5'-dimethylphenyl)-5-methoxy-6-tert-butylinden-1-yl] zirconium dichloride, rac-anti-dimethylsilanediyl[2-methyl-4,8-bis-(3,5"-dimethylphenyl)-1,5,6,7-tetrahydro-s-indacen-1-yl][2-methyl-4-(3',5'-5 ditert-butyl-phenyl)-5-methoxy-6-tert-butylinden-1-yl] zirconium dichloride.

Especially preferred is rac-anti-dimethylsilanediyl[2-methyl-4,8-bis-(3',5'-dimethylphenyl)-1,5,6,7-tetrahydro-s-indacen-1-yl] [2-methyl-4-(3',5'-dimethylphenyl)-5-methoxy-6-tert-butylinden-1-yl] zirconium dichloride.

Cocatalyst

To form an active catalytic species it is normally necessary to employ a cocatalyst as is well known in the art.

According to the present invention a cocatalyst system comprising a boron containing cocatalyst and an aluminoxane cocatalyst is used in combination with the above defined metallocene catalyst complex.

The aluminoxane cocatalyst can be one of formula (I):

(I)

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, C1-C10-alkyl, preferably C1-C5-alkyl, or C3-C10-cycloalkyl, C7-C12-arylalkyl or -alkylaryl and/or phenyl or naphthyl, and where Y can be hydrogen, halogen, preferably chlorine or bromine, or C1-C10-alkoxy, preferably methoxy or ethoxy. The resulting oxygen-containing aluminoxanes are not in general pure compounds but mixtures of oligomers of the formula (I).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

Also a boron containing cocatalyst is used in combination with the aluminoxane cocatalyst.

The catalyst complex ideally comprises a co-catalyst, certain boron containing cocatalysts are preferred. Especially preferred borates of use in the invention therefore comprise the trityl, i.e. triphenylcarbenium, ion. Thus the use of $Ph_3CB(PhF_5)_4$ and analogues therefore are especially favoured.

The catalyst system of the invention is used in supported form. The particulate support material used is silica or a mixed oxide such as silica-alumina, in particular silica. The use of a silica support is preferred. The skilled practitioner is aware of the procedures required to support a metallocene catalyst.

In a preferred embodiment, the catalyst system corresponds to the ICS3 of WO 2020/239598 A1.

Article

The present invention is further directed to a film comprising at least 90 wt.-% of the heterophasic propylene ethylene copolymer composition (HECO) as described in the previous sections.

Preferably, the film is a cast film.

The film, more preferably the cast film, comprises at least 90 wt.-%, more preferably at least 93 wt.-%, yet more preferably at least 95 wt.-%, still more preferably at least 98 wt.-%, of the heterophasic propylene ethylene copolymer composition (HECO).

Other polymeric components in addition to the heterophasic propylene ethylene copolymer composition can be present in the film, more preferably the cast film; however, it is preferred that the heterophasic propylene ethylene copolymer composition (HECO) is the only polymeric component in the film, more preferably the cast film.

In one particularly preferred embodiment, the film, more preferably the cast film, consists of the heterophasic propylene ethylene copolymer composition (HECO).

It is preferred that the film, more preferably the cast film, has a thickness in the range from 5 to 100 μm, more preferably in the range from 10 to 80 μm, most preferably in the range from 20 to 70 μm.

The film, more preferably the cast film, comprising the heterophasic propylene ethylene copolymer composition (HECO) preferably has a seal strength, measured according to the method described herein, in the range from 8.0 to 40 N, more preferably in the range from 10.0 to 35 N, most preferably in the range from 15.0 to 30 N.

It is preferred that the film, more preferably the cast film, has a haze value before steam sterilization, measured according to ASTM D1003, of below 7.0%, more preferably below 6.0%, most preferably below 5.0%.

It is preferred that the film, more preferably the cast film, has a haze value after steam sterilization, measured according to ASTM D1003, of below 9.0%, more preferably below 7.0%, most preferably below 5.0%.

It is preferred that the film, more preferably the cast film, has a tensile modulus in the machine direction (MD), measured according to ISO 527-3, in the range from 1000 to 1500 MPa, more preferably in the range from 1100 to 1400 MPa, most preferably in the range from 1150 to 1300 MPa.

It is preferred that the film, more preferably the cast film, has a tensile modulus in the transverse direction (TD), measured according to ISO 527-3, in the range from 900 to 1500 MPa, more preferably in the range from 1000 to 1400 MPa, most preferably in the range from 1100 to 1250 MPa.

The film, more preferably the cast film, may be a monolayer film. Alternatively, the film, more preferably the cast film, may be present as a single layer in a multilayer film.

When the film is present as a single layer in a multilayer film the film can be produced by any means known in the art. It is preferred that the multilayers films are prepared by means of cast film co-extrusion.

EXAMPLES

1. Definitions/Determination Methods

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy ($H_m$) are determined from the second heating step.

Quantification of PP Matrix Microstructure by NMR Spectroscopy

Quantitative nuclear-magnetic resonance (NMR) spectroscopy was used to quantify the stereo-regularity (tacticity) and regio-regularity of the crystalline matrix of the polymers. Quantitative $^{13}C$ $\{^1H\}$ NMR spectra were recorded in the solution-state using a Bruker Advance III 400 NMR spectrometer operating at 400.15 and 100.62 MHz for 1H and 13C respectively. All spectra were recorded using a $^{13}C$ optimised 10 mm extended temperature probe head at 125° C. using nitrogen gas for all pneumatics.

For polypropylene homopolymers approximately 200 mg of material was dissolved in 1,2-tetrachloroethane-d2 (TCE-d2). To ensure a homogenous solution, after initial sample preparation in a heat block, the NMR tube was further heated in a rotatary oven for at least 1 hour. Upon insertion into the magnet, the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative 13C{1H} NMR spectra were processed, integrated and relevant quantitative properties determined from the integrals using proprietary computer programs. For polypropylene homopolymers all chemical shifts are internally referenced to the methyl isotactic pentad (mmmm) at 21.85 ppm. The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences. The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253). The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$P_{total}=P_{12}+P_{21e}$

The mole percent of 2,1 erythro regio defects was quantified with respect to all propene:

$[21e]\ mol\ \%=100*(P_{21e}/P_{total})$

Dynamic Mechanical Thermal Analysis (DMTA)

The glass transition temperature $T_g$ is determined by dynamic mechanical thermal analysis (DMTA) according to ISO 6721-7. The measurements are done in torsion mode on compression moulded samples (40×10×1 mm3) between −100° C. and +150° C. with a heating rate of 2° C./min and a frequency of 1 Hz. Storage modulus G' is determined at +23° C. according ISO 6721-7:1996. The measurements are done in torsion mode on compression moulded samples (40×10×1 mm3) between −150° C. and +150° C. with a heating rate of 2° C./min and a frequency of 1 Hz.

Flexural Modulus

The flexural modulus was determined in 3-point-bending at 23° C. according to ISO 178 on 80×10×4 $mm^3$ test bars injection moulded in line with EN ISO 1873-2.

Notched Impact Strength (NIS)

The Charpy notched impact strength (NIS) was measured according to ISO 179 1 eA at +23° C. or −20° C., using injection moulded bar test specimens of 80×10×4 $mm^3$ prepared in accordance with EN ISO 1873-2.

Crystex Analysis

Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia, Spain).

A schematic representation of the CRYSTEX QC instrument is shown in FIG. 1a. The crystalline and amorphous fractions are separated through temperature cycles of dissolution at 160° C., crystallization at 40° C. and re-dissolution in a 1,2,4-trichlorobenzene (1,2,4-TCB) at 160° C. as shown in FIG. 1b. Quantification of SF and CF and determination of ethylene content (C2) are achieved by means of an infrared detector (IR4) and an online 2-capillary viscometer, which is used for the determination of the intrinsic viscosity (iV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt.-% to 69 wt.-% (determined by 13C-NMR spectroscopy) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt.-%.

The intrinsic viscosity (iV) of the parent EP copolymer and its soluble and crystalline fractions are determined with a use of an online 2-capillary viscometer and are correlated to corresponding iV's determined by standard method in decalin according to ISO 1628.

Calibration is achieved with various EP PP copolymers with iV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

As shown in a FIGS. 1a and 1b, a defined volume of the sample solution is injected into the column filled with inert support where the crystallization of the sample and separation of the soluble fraction from the crystalline part is taking place. This process is repeated two times. During the first injection the whole sample is measured at high temperature, determining the iV[dl/g] and the C2[wt.-%] of the PP composition. During the second injection, the soluble fraction (at low temperature) and the crystalline fraction (at high temperature) with the crystallization cycle are measured (wt.-% SF, wt.-% C2, iV).

EP means ethylene propylene copolymer.
PP means polypropylene.

Intrinsic Viscosity

The intrinsic viscosity (iV) is measured according to DIN ISO 1628/1, October 1999, in Decalin at 135° C.

Haze

Haze was determined according to ASTM D1003-00 on 60×60×1 mm³ plaques injection moulded in line with EN ISO 1873-2 or directly on the 50 μm cast film produced in the experimental section.

Seal Strength

The heat-seal experiments were performed on at least 3 film specimens of 85 mm wide by 200 mm length cut in the machine direction. The 5 mm×150 mm Teflon coated steel heating bars were set to a temperature of 110° C. Two films were sealed by positioning, one on top of the other using a 0.5 s sealing time and 0.67 N/mm² pressure. The resulting sealed area was 85 mm×5 mm. The specimens were then conditioned for 7 days (±24 h) at 23° C. (±2° C.)/50% RH (±10%). 10 specimens of 15 mm width were cut and tested in tensile mode at 23° C. (±2° C.)/50% RH (±10%) on a Universal Testing Machine (Zwick Z005). The clamping distance used was 100 mm, and a test speed of 200 mm/min. The yielding force and maximum force were measured for each test specimen.

Basic Sealing:
    Film width: 85 mm
    Film length: >200 mm
    Sealed seam width: 5 mm
    Sealing temperature: 110° C.
    Sealing pressure: 0.67 N/mm²
    Sealing time: 0.5 s
    Sealing jaws: Teflon coated Conditioning
    Conditioning time: 7 days (±24 h) at 23° C. (±2° C.)/50% RH (±10%)

Heat Seal Strength:
    Test temperature: 23° C. (±2° C.)/50% RH (±10%)
    Specimen width: 15 mm
    Gripping distance: 100 mm
    Test speed: 200 mm/min
    Test device: Universal Testing Machine Tensile Modulus Tensile modulus in machine and transverse direction was determined according to ISO 527-3 at 23° C. on cast films of 50 μm thickness produced on a monolayer cast film line with a melt temperature of 220° C. and a chill roll temperature of 20° C. Testing was performed at a cross-head speed of 1 mm/min.

Steam Sterilization

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further

2. Experimental 2.1 Polymerization of the Inventive HECO (IE1)

Catalyst Synthesis

The catalyst used was Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride as disclosed in WO 2020/239598 A1 as ICS3.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressurising and depressurising with nitrogen using manual valves. Then toluene (22 kg) was added. The mixture was stirred for 15 min. Next 30 wt.-% solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.2% Al by weight.

Catalyst Preparation 30 wt.-% MAO in toluene (0.7 kg) was added into a steel nitrogen blanked reactor via a burette at 20° C. Toluene (5.4 kg) was then added under stirring. The catalyst as cited above (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N₂ flow at 60°C for 2 h and additionally for 5 h under vacuum (−0.5 barg) under stirring. Dried catalyst was sampled in the form of pink free flowing powder containing 13.9% Al and 0.11% Zr.

The inventive HECO IE1 was polymerized according to the conditions in Table 1.

The resulting polymer powder was compounded with 1250 ppm of Calcium cis-1,2-cyclohexanedicarboxylate (Hyperform HPN-20E), supplied by Milliken, USA, 2000 ppm of Irganox 225 (1:1-blend of Pentaerythrityl-tetrakis (3-(3',5'-di-tert.butyl-4-hydroxytoluyl)-propionate and tris (2,4-di-t-butylphenyl)phosphite), supplied by BASF AG, Germany, and 1000 ppm of calcium stearate, supplied by Croda, UK.

2.2 Polymerization of the Comparative HECO (CE1)

For the polymerization process of the comparative HECO CE1, a Ziegler-Natta type catalyst as used for the inventive examples of WO 2016/066446 A1 and pre-polymerized with vinylcyclohexane to achieve nucleation with poly(vinylcyclohexane) was used.

Nucleation by prepolymerization with vinylcyclohexane is described in EP 2 960 256 B1 and EP 2 960 279 B1 in detail. The comparative HECO CE1 was polymerized according to the conditions in Table 1, using dicyclopentyl dimethoxy silane (donor D) as external donor and triethyl aluminium (TEAL) as co-catalyst. The resulting polymer powder was compounded with 1250 ppm of Calcium cis-1, 2-cyclohexanedicarboxylate (Hyperform HPN-20E, supplied by Milliken, USA), 2000 ppm of Irganox 225 (1:1-blend of Pentaerythrityl-tetrakis(3-(3',5'-di-tert.butyl-4-hydroxytoluyl)-propionate and tris(2,4-di-t-butylphenyl) phosphite), supplied by BASF AG, Germany, and 1000 ppm of calcium stearate, supplied by Croda, UK.

2.3 Cast Film Production

Films were produced on a Barmag CAST-Coex pilot line, equipped with an extruder of 60 mm diameter and an L/D ratio of 30. A coathanger die with a die width of 800 mm and a die gap of 0.5 mm was used.

The 50 μm films were produced in cast mode with an output of 60 kg/h, a line speed of 30 m/min and a melt temperature of 239° C.

Roll settings: 1$^{st}$ roll: diameter 400 mm and 15° C.: 2$^{nd}$ roll: diameter 250 mm and 25° C.

Electric pinning via electrostatic charging was applied.

TABLE 1

Polymerization conditions for inventive and comparative HECOs

|  |  | IE1 | CE1 |
|---|---|---|---|
| Prepolymerization | | | |
| TEAL/Ti ratio | mol/mol | — | 173 |
| TEAL/donor ratio | mol/mol | — | 8.0 |
| Temperature | ° C. | 20 | 30 |
| Residence time | min | 22 | 15 |
| Loop | | | |
| Temperature | ° C. | 70 | 80 |
| Split | wt.-% | 52 | 39 |
| Feed H2/C3 | mol/kmol | 0.07 | 0.40 |
| MFR$_2$ | g/10 min | 2.2 | 2.4 |
| First GPR | | | |
| Temperature | ° C. | 80 | 80 |
| Split | wt.-% | 33 | 50 |
| H2/C3 | mol/kmol | 1.3 | 7.0 |
| MFR2 | g/10 min | 2.2 | 2.4 |

TABLE 1-continued

Polymerization conditions for inventive and comparative HECOs

|  |  | IE1 | CE1 |
|---|---|---|---|
| Second GPR | | | |
| Temperature | ° C. | 70 | 75 |
| C2/C3 | mol/kmol | 768 | 223 |
| H2/C2 | mol/kmol | 2.9 | 551 |
| Split | wt.-% | 15 | 11 |
| MFR$_2$ | g/10 min | 2.3 | 3.0 |
| Pellet | | | |
| Tm | ° C. | 157 | 167 |
| T$_g$(E) | ° C. | −43.6 | −43.0 |
| T$_g$(M) | ° C. | −0.3 | 0.7 |
| SF | wt.-% | 11.9 | 13.9 |
| CF | wt.-% | 88.2 | 86.2 |
| C2(total) | mol-% | 2.88 | 6.56 |
| C2(SF) | mol-% | 26.8 | 36.9 |
| C2(CF) | mol-% | 0 | 3.23 |
| iV(total) | dl/g | 2.38 | 2.60 |
| iV(SF) | dl/g | 2.05 | 1.67 |
| iV(CF) | dl/g | 2.41 | 2.70 |
| G' | MPa | 672 | 723 |
| Flexural Modulus | MPa | 1265 | 1400 |
| Charpy NIS (23° C.) | kJ/m$^2$ | 41.3 | 40.0 |
| Charpy NIS (−20° C.) | kJ/m$^2$ | 1.97 | 1.80 |
| Haze | % | 47 | 54 |
| 50 μm film | | | |
| Tensile Modulus (MD) | MPa | 1177 | 1292 |
| Tensile Modulus (TD) | MPa | 1108 | 1154 |
| Seal Strength | N | 17.8 | 6.9 |
| Haze (before sterilization) | % | 4.4 | 4.7 |
| Haze (after sterilization) | % | 4.8 | 5.3 |

As can be seen from Table 1, the inventive HECO (IE1) has comparable mechanical properties (Flexural Modulus, Tensile Modulus and Impact Strength), whilst having improved optical properties (haze) and significantly improved seal strength, in comparison to the comparative HECO (CE1).

The invention claimed is:

1. A heterophasic propylene ethylene copolymer composition (HECO) having a melt flow rate (MFR$_2$) measured according to ISO 1133 at 230° C. and 2.16 kg in the range from 1.0 to 5.0 g/10 min, a total ethylene content C(C2), as determined by quantitative IR spectroscopy, in the range from 0.8 to 6.0 mol-%, and a melting temperature (T$_m$) measured by differential scanning calorimetry (DSC) in the range from 153.0 to 159.0° C., comprising:
   a) a crystalline matrix (M) being a propylene homo- or copolymer; and
   b) an amorphous propylene-ethylene elastomer (E);
   wherein the heterophasic propylene ethylene copolymer composition is characterized in terms of its soluble fraction (SF) and crystalline fraction (CF) as determined by CRYSTEX QC analysis:
   i) from 85.0 to 90.0 wt.-%, based on the total weight of the heterophasic propylene ethylene copolymer composition, of a crystalline fraction (CF) having an intrinsic viscosity iV(CF) measured according to DIN ISO 1628/1, October 1999 (in Decalin at 135° C.) in the range from 2.00 to 3.00 dl/g, an ethylene content C2(CF), as determined by quantitative IR spectroscopy, in the range from 0.0 to 1.5 mol-%; and
   ii) from 10.0 to 15.0 wt.-%, based on the total weight of the heterophasic propylene ethylene copolymer composition, of a soluble fraction (SF) having an intrinsic viscosity iV(SF) measured according to DIN ISO 1628/

1, October 1999 (in Decalin at 135° C.) in the range from 1.30 to 2.50 dl/g and an ethylene content C2(SF), as determined by quantitative IR spectroscopy, in the range from 25.0 to 40.0 mol-%.

2. The heterophasic propylene ethylene copolymer composition (HECO) according to claim 1, having an intrinsic viscosity (iV) measured according to DIN ISO 1628/1, October 1999 (in Decalin at 135° C.) in the range from 2.00 to 3.00 dl/g.

3. The heterophasic propylene ethylene copolymer composition (HECO) according to claim 1, wherein the crystalline matrix (M) has a melt flow rate ($MFR_2$) measured according to ISO 1133 at 230° C. and 2.16 kg in the range from 1.0 to 10.0 g/10 min.

4. The heterophasic propylene ethylene copolymer composition (HECO) according to claim 1, wherein the ratio of the intrinsic viscosities of the soluble and crystalline fractions, iV(SF)/iV(CF), is in the range from 0.50 to 1.00.

5. The heterophasic propylene ethylene copolymer composition (HECO) according to claim 1, wherein the crystalline matrix (M) is a homopolymer having an isotactic pentad concentration [mmmm] as determined by $^{13}$C-NMR spectroscopy of more than 97.0% and a content of 2,1-regiodefects as determined by $^{13}$C-NMR spectroscopy in the range from 0.1 to 1.4 mol-%.

6. The heterophasic propylene ethylene copolymer composition (HECO) according to claim 1, having a crystallization temperature ($T_c$) measured by differential scanning calorimetry (DSC) in the range from 120.0 to 127.0° C.

7. The heterophasic propylene ethylene copolymer composition (HECO) according to claim 1, having:
  i) a glass transition temperature associated with the amorphous propylene-ethylene elastomer ($T_g(E)$), measured according to ISO 6721-7, in the range from −50 to −40° C.; and/or
  ii) a glass transition temperature associated with the crystalline matrix ($T_g(M)$), measured according to ISO 6721-7, in the range from −5 to 5° C.

8. The heterophasic propylene ethylene copolymer composition (HECO) according to claim 1, having:
  i) a flexural modulus measured according to ISO 178 in the range from 1100 to 1500 MPa,
  ii) a Charpy Notched Impact Strength (NIS) measured according to ISO 179-1 eA at 23° C. in the range from 25.0 to 100 kJ/m$^2$, and/or
  iii) a Charpy Notched Impact Strength (NIS) measured according to ISO 179-1 eA at −20° C. in the range from 1.0 to 20 KJ/m$^2$.

9. The heterophasic propylene ethylene copolymer composition (HECO) according to claim 1, wherein the ethylene content of the CRYSTEX QC soluble fraction C2(SF), as determined by quantitative IR spectroscopy, is in the range from 25.0 to 33.0 mol-%.

10. The heterophasic propylene ethylene copolymer composition (HECO) according to claim 1, wherein
  i) the intrinsic viscosity of the CRYSTEX QC soluble fraction iV(SF), as measured according to DIN ISO 1628/1, October 1999 (in Decalin at 135° C.), is in the range from 1.80 to 2.30 dl/g; and/or
  ii) the intrinsic viscosity of the CRYSTEX QC crystalline fraction iV(CF), as measured according to DIN ISO 1628/1, October 1999 (in Decalin at 135° C.), is in the range from 2.30 to 2.60 dl/g.

11. A film comprising at least 90 wt.-% of the heterophasic propylene ethylene copolymer composition (HECO) according to claim 1.

12. The film according to claim 11, having a thickness in the range from 5 to 100 μm.

13. The film according to claim 11, having a seal strength, in the range from 8.0 to 40 N.

14. The film according to claim 11, having:
  i) a haze value before steam sterilization, measured according to ASTM D1003, of below 7.0%; and/or
  ii) a haze value after steam sterilization, measured according to ASTM D1003, of below 9.0%.

15. The film according to claim 11, having:
  i) a tensile modulus in the machine direction (MD), measured according to ISO 527-3, in the range from 1000 to 1500 MPa; and/or
  ii) a tensile modulus in the transverse direction (TD), measured according to ISO 527-3, in the range from 900 to 1500 MPa.

16. The film according to claim 11 being a cast film.

* * * * *